(12) United States Patent
Tanaka et al.

(10) Patent No.: US 7,708,033 B2
(45) Date of Patent: May 4, 2010

(54) LINING MATERIAL AND PIPELINE LINING METHOD

(75) Inventors: Fuminori Tanaka, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 51 days.

(21) Appl. No.: 11/998,385

(22) Filed: Nov. 29, 2007

(65) Prior Publication Data

US 2008/0251151 A1 Oct. 16, 2008

(30) Foreign Application Priority Data

Dec. 4, 2006 (JP) .............................. 2006-326414

(51) Int. Cl.
*F16L 55/16* (2006.01)

(52) U.S. Cl. ........................... 138/98; 138/97; 156/292; 156/187; 405/150.1; 405/184.1; 264/516

(58) Field of Classification Search ................... 138/97, 138/98, 118, DIG. 7; 156/292, 274.2, 287, 156/294, 187; 264/36, 516; 405/150.1, 184.1
See application file for complete search history.

(56) References Cited

U.S. PATENT DOCUMENTS

| 3,894,328 | A | * | 7/1975 | Jansson ........................ 29/451 |
| 4,207,130 | A | * | 6/1980 | Barber ................... 156/244.13 |
| 4,880,035 | A | * | 11/1989 | Vetter ........................... 138/99 |
| 5,034,180 | A | * | 7/1991 | Steketee, Jr. ................. 264/516 |
| 5,385,173 | A | * | 1/1995 | Gargiulo ....................... 138/98 |
| 5,487,411 | A | * | 1/1996 | Goncalves .................... 138/98 |
| 5,698,056 | A | * | 12/1997 | Kamiyama et al. .......... 156/218 |
| 5,765,597 | A | * | 6/1998 | Kiest et al. .................... 138/98 |
| 5,810,053 | A | * | 9/1998 | Mandich ....................... 138/98 |
| 5,861,116 | A | * | 1/1999 | Mandich ....................... 264/35 |
| 5,950,682 | A | * | 9/1999 | Kiest, Jr. ....................... 138/98 |
| 5,964,249 | A | * | 10/1999 | Kiest, Jr. ....................... 138/98 |
| 6,019,136 | A | * | 2/2000 | Walsh et al. ................... 138/98 |
| 6,146,491 | A | * | 11/2000 | Wood et al. .................. 156/344 |
| 6,723,266 | B1 | * | 4/2004 | Lippiatt ................. 264/173.17 |
| 7,258,141 | B2 | * | 8/2007 | Catha et al. .................... 138/98 |

* cited by examiner

*Primary Examiner*—Patrick F Brinson
(74) *Attorney, Agent, or Firm*—Adams & Wilks

(57) ABSTRACT

A flexible tubular lining material impregnated with a thermosetting resin is folded and bound with binding members to provide a reduced width. Two elastic and rigid strip members are inserted into loop members attached to the lining material and are removably attached so as to sandwich the lining material. During pipeline lining work, the lining material to which the strip members have been attached is first inserted into a lateral pipe from a main pipe. The strip members are then removed from the lining material so that the lining material may remain inside the pipeline. The strip members are extracted from the pipeline, and the lining material is then made to expand via application of pressure from the inside. While kept in contact with the inner peripheral surface of the pipeline, the lining material is heated in order to cure the thermosetting resin thereof.

20 Claims, 4 Drawing Sheets

LINING MATERIAL AND PIPELINE LINING METHOD

BACKGROUND OF THE INVENTION

1. Field of the Invention

The present invention relates to a lining material used to line pipelines in order to repair an aged pipeline, and a pipeline lining method using the same.

2. Description of the Prior Art

When a communications pipe, gas pipe, sewer pipe, water pipe, electrical pipe, or other pipeline buried under ground has aged and a pipe in the pipeline is to be repaired without the pipe being removed from the ground, pipeline lining methods are used in which a tubular pipe lining material impregnated with a thermosetting resin is inserted into the pipeline by pushing or drawing, the lining material is heated while being expanded by air pressure or the like and pressed against an inner peripheral surface of the pipeline, and the thermosetting resin of the lining material is cured to line the pipeline. Air pressure is used to evert and insert the lining material into the pipeline (e.g., Japanese Laid-open Patent Application No. 2006-123547).

However, in the conventional insertion method for a lining material, insertion in pipelines is extremely difficult in sections that are bent at a right angle or close to a right angle. Specifically, with the method in which the material is pushed in while being everted, the eversion does not occur in the sections bent at a right angle or close to a right angle. Furthermore, with a drawing-in method, the contact resistance of the lining material increases as the bent sections increase, and the lining material therefore becomes heavier and is unable to be drawn in. If drawing in continued forcibly, the lining material is stretched and damaged, which dramatically reduces the product quality of the lining material.

An object of the present invention is to provide a lining material capable of being easily and smoothly inserted into a pipeline even where there is a plurality of sections bent at a right angle or close to a right angle, and to provide a pipeline lining method using the same.

SUMMARY OF THE INVENTION

The lining material of the present invention is a flexible tubular lining material impregnated with thermosetting resin, wherein an elastic and rigid strip member is removably attached to the lining material.

A pipeline lining method according to the invention uses a flexible tubular lining material impregnated with thermosetting resin and comprises the steps: removably attaching an elastic and rigid strip member to the lining material; drawing or inserting into a pipeline the lining material to which the strip member is attached; removing and extracting the strip member from the lining material while retaining the lining material inside the pipeline; and subjecting the lining material to pressure to cause it to expand against an inner peripheral surface of the pipeline and heating the lining material to cause the thermosetting resin thereof to be cured.

In the lining material of the present invention, the strip member imparts elasticity and rigidity to allow the trunk to be reinforced. Therefore, the lining material can be easily and smoothly inserted into a pipeline even where there is a plurality of sections bent at a right angle or close to a right angle, and it is possible to prevent the lining material from being stretched and damaged by forcible insertion. The lining material can be protected by the strip member during insertion, making it possible to prevent damage to the lining. The pipeline lining method of the present invention uses a lining material having a strip member of the present invention. Therefore, insertion of the lining material into a pipeline can be easily and smoothly performed, stretching and damage to the lining material can be prevented, and the time for lining work can be reduced.

Further features of the invention, its nature and various advantages will be more apparent from the accompanying drawings and following detailed description of the invention.

DESCRIPTION OF THE PREFERRED EMBODIMENTS

The present invention will now be described in detail with reference to the embodiments shown in the accompanying drawings.

Figure 1:
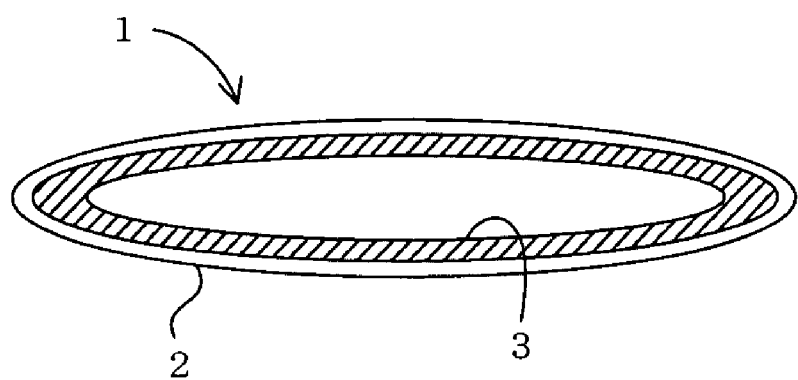
FIG. 1 is a cross-sectional view showing the structure of the lining material.

FIG. 1 shows a lining material used to repair pipelines. The lining material 1 is a flexible tubular material comprising a flexible cylindrical resin-absorbing material 3 of a non-woven fabric or the like whose exterior surface is covered by a flexible tube 2 of polyethylene or the like. The resin-absorbing material 3 is impregnated with an uncured liquid thermosetting resin.

Figure 2:
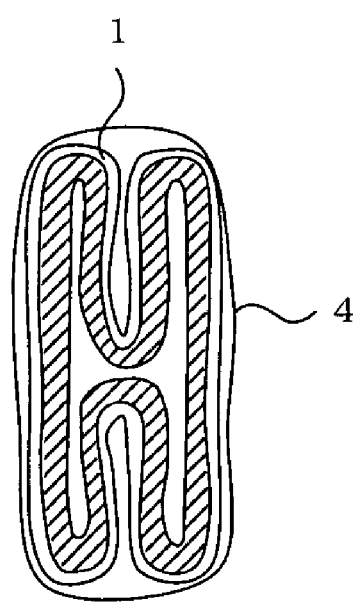
FIG. 2 is a cross-sectional view showing the lining material in FIG. 1 folded into the shape of an H and bound with tape.
Figure 3:
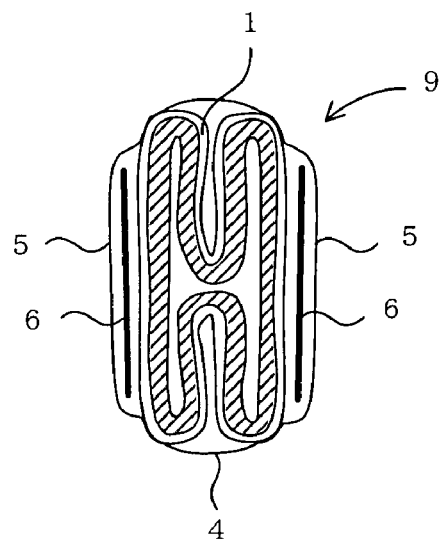
FIG. 3 is a cross-sectional view showing the belted lining material with steel belts attached on the lining material.
Figure 4:
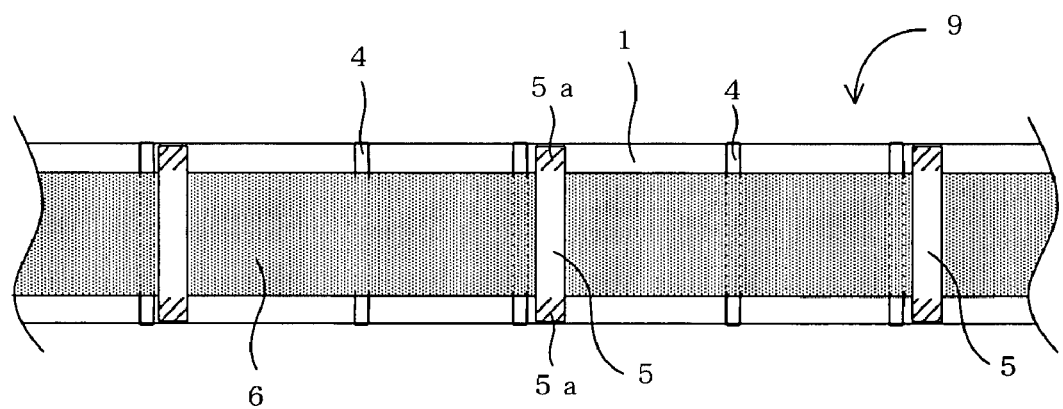
FIG. 4 is a side view showing the lining material with the steel belts attached.
Figure 5:
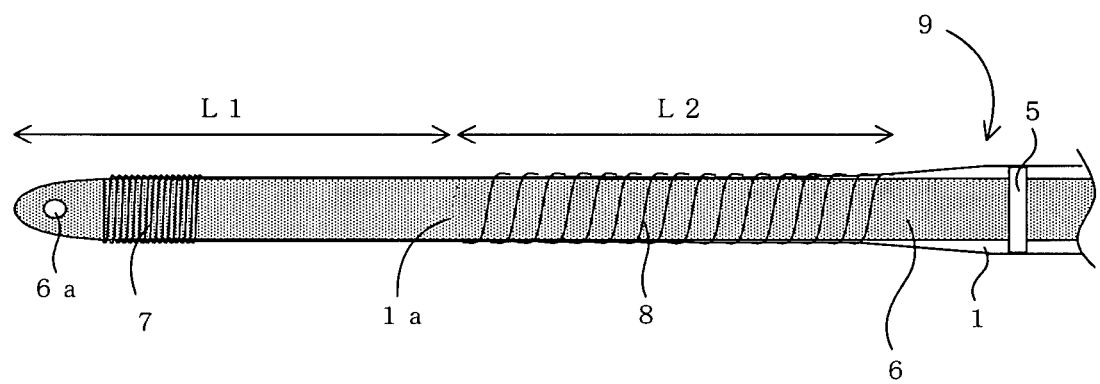
FIG. 5 is a side view of the tip of the belted lining material.

In the present embodiment, the lining material 1 is folded and bound so as to provide a reduced width, as shown in FIG. 2, and a steel belt 6 as shown in FIGS. 3 to 5 is removably attached to the folded lining material to provide a steel-belted lining material 9 (hereafter abbreviated as belted lining material) in order to facilitate the insertion of the lining material into the pipeline.

The steel belt 6 is elastic and rigid, imparts elasticity and rigidity to the lining material 1, and reinforces the trunk of the lining material 1. The belt also partially covers and protects the lining material 1. The belt 6 is composed of a thin steel plate, but it may be composed of strips of steel wire bundled together and covered with rubber and the like.

An opening 6a is formed in the tip of the steel belt 6, as shown in FIG. 5. This opening 6a is used to tie a rope or the like for pulling the belted lining material 9 when inserting the belted lining material 9 into a pipeline.

To fabricate the belted lining material 9, the lining material 1 is first folded, as shown in FIG. 2, so that the cross section is in the shape of an H. As shown in FIGS. 2 and 4, a tape 4 (binding member) such as cellophane tape is wound around the width of the lining material 1 at a suitable interval of approximately several tens of centimeters in the lengthwise direction of the lining material 1 to bind the lining material 1. It is acceptable to bind the material with a string or other member instead of tape 4.

Folding the lining material 1 is not limited to the shape of an H, and any shape is acceptable as long as the material easily extends when made to expand into a cylindrical shape upon application of pressure after inserting the lining material 1 into the pipeline.

Next, as shown in FIGS. 3 and 4, belt loops 5 (loop members) for passing the steel belt 6 therethrough are attached on both sides in the lengthwise direction of the folded lining material 1 at suitable intervals, such as twice the interval of the tape 4. The belt loops 5 serve to guide the steel belt 6 therethrough with some space maintained and to prevent the steel belt 6 from shifting significantly from the lining material 1. The belt loops 5 are formed in a strip from a film such as polyethylene and the like, and both ends 5a of the belt loop 5 are secured by welding or the like to the exterior surface (the exterior surface of tube 2) of the folded lining material 1.

Next, as shown in FIGS. 3 through 5, the steel belt 6 is attached to each side surface in the lengthwise direction of the lining material 1 so as to sandwich the lining material 1. For this purpose, one steel belt is inserted into the belt loops 5 on one side of the lining material 1 and the other steel belt into the belt loops 5 on the other side thereof. As shown in FIG. 5, the ends of each steel belt 6 extend a suitable length L1 (e.g., approximately 30 centimeters) from the end 1a of the lining material 1, and the steel belts 6 are fixed at the ends by being bound with a strong thread 7. A strong thread 8 is also used to wrap and tie the steel belts 6 and the lining material 1 at the section extending a length of L2 (e.g., approximately 30 centimeters) from the end 1a of the lining material 1 in the direction opposite to the tip of the steel belt 6. It is acceptable to use other materials such as string instead of the threads 7 and 8. This completes the belted lining material 9.

If the threads 7 and 8 are cut in the belted lining material 9, the bond between the ends of the steel belt 6 and the bond between the steel belt 6 and the end of the lining material 1 is disconnected. If each end of the steel belt 6 is pulled, the steel belt 6 can be pulled through each belt loop 5 and removed from the lining material 1.

The belt loops 5 can be attached to the lining material 1 from the top of the steel belt 6 after the end of the steel belt 6 and the end of the lining material 1 have been fixed.

Figure 6:
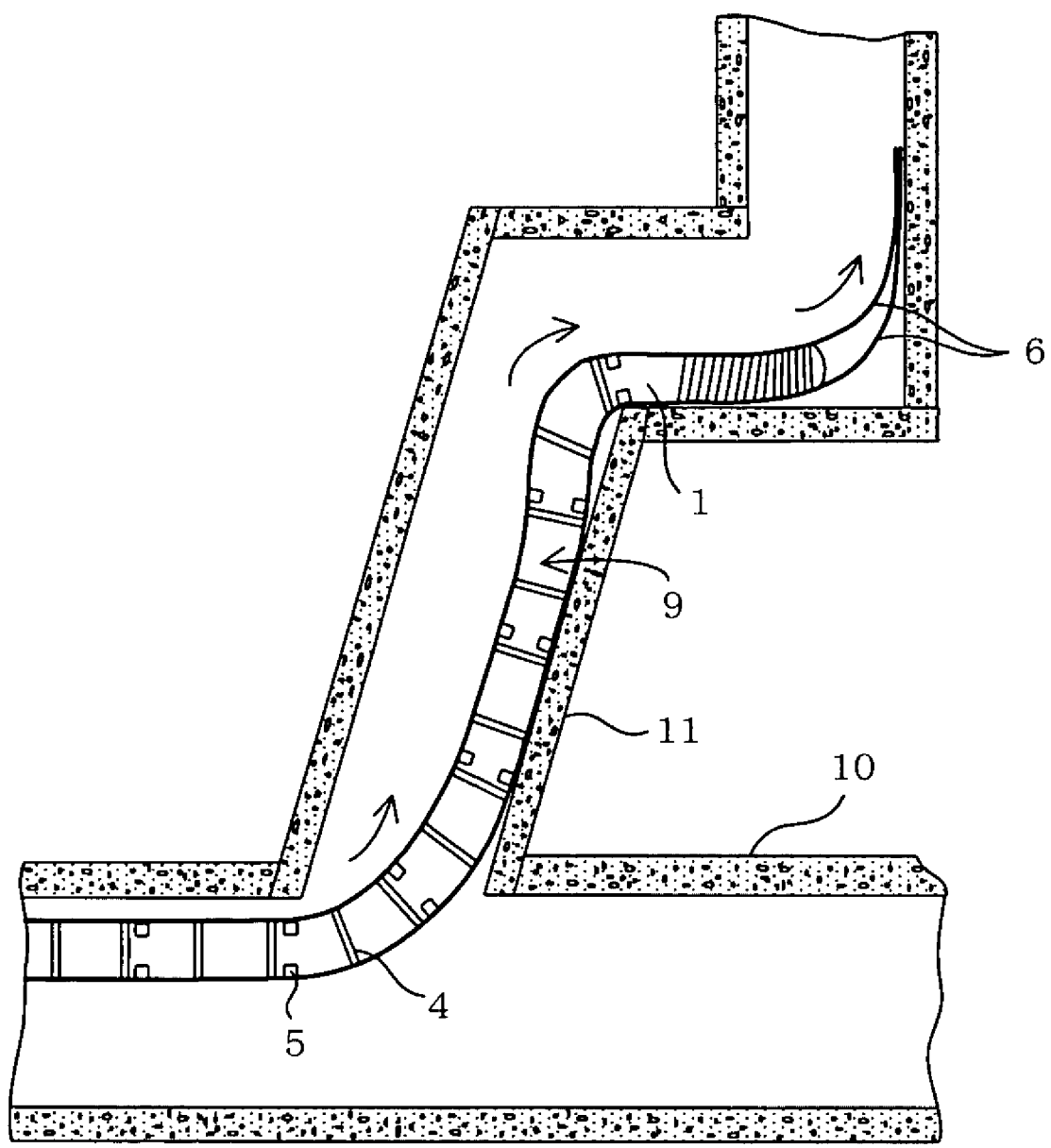
FIG. 6 is an illustrative view showing a state in which the belted lining material is inserted into the lateral pipe from the main pipe.

During the pipeline lining work, the belted lining material 9 prepared as indicated above is pushed or drawn into the pipeline, as shown in FIG. 6. If drawn in, the belted lining material 9 is tied with a rope or the like to the opening 6a on the end of the steel belt 6 and is then pulled.

FIG. 6 shows the state where the belted lining material 9 is inserted into a bent lateral pipe 11 from a main pipe 10 of a pipeline. Compared to merely the lining material, the steel belt 6 imparts elasticity and rigidity to the belted lining material 9, and reinforces the trunk. Furthermore, the width of the belted lining material 9 is narrower than the width of the original lining material 1 because it is folded. In particular, the section having a length of L1 from the end of the steel belt 6 does not sandwich the lining material, provides enhanced elasticity and flexibility, and easily bends in accordance with the bent sections of the pipeline that are bent at a right angle or close to a right angle, and fulfills the role of guiding subsequent sections.

Even if there is a plurality of locations that are bent at a right angle or close to a right angle in the lateral pipe 11, the contact resistance of the belted lining material 9 is low, the belted lining material 9 can be easily and smoothly inserted, and the time required for lining work can be reduced. Also, since the contact resistance is low and the steel belt 6 protects the lining material 1, it is possible to prevent stretching and damage to the lining material 1.

When insertion of the belted lining material 9 into the pipeline has been completed, the threads 7 and 8 at the ends of the belted lining material 9 are cut, which disconnects the bond between the ends of the steel belt 6 and the bond between the steel belt 6 and the end of the lining material 1. If the two ends of the steel belt 6 are pulled, the steel belt 6 can be slid against the lining material 1 inside the pipeline. This allows the steel belts 6 to be pulled and extracted from the pipeline and the lining material 1 to be left inside the pipeline.

Next, the lining material 1 remaining inside the pipeline is made to expand via application of pressure from the inside, such as air pressure or the like. The strength of the tape 4 is set so that the tape 4 can be cut with the increased pressure at this point. The tape 4 is thereby cut by the increased pressure, and the lining material 1 folded and bound by the tape 4 spreads out and expands into a cylindrical shape and is pressed against the inner peripheral surface of the pipeline. In this state, the lining material 1 is heated by a hot water shower or steam inside the lining material 1, the thermosetting resin impregnated into the lining material 1 is cured, and the pipeline is lined.

According to the embodiment as described above, the lining material can be easily and smoothly inserted into a pipeline with a plurality of locations that, as indicated above, are bent at a right angle or close to a right angle, and the time for lining work can be reduced. Also, stretching and damage can be prevented during insertion of the lining material, thus protecting the quality of the lining material.

According to the embodiment as described above, the steel belt 6 can be attached across the entire length of the lining material 1, or can be attached across a portion of the entire length of the lining material 1.

In the embodiment, two steel belts 6 are attached so as to sandwich the lining material 1, but it is acceptable to attach only one belt to one side of the lining material 1. It is also acceptable to attach three or more belts so as to enclose the lining material 1.

Furthermore, instead of the steel belt 6, another elastic and rigid belt member composed of a non-steel metal, plastic, or other material can be attached to the lining material 1.

The lining material of the present invention can be used not only as a lining for a communications pipe, gas pipe, sewer pipe, water pipe, electrical pipe, or other subterranean pipeline, but also as a lining for a communications pipe, gas pipe, sewer pipe, water pipe, electrical pipe, or other pipeline inside apartment buildings, office buildings, and other buildings.

What is claimed is:

1. A lining material comprising: a flexible tubular lining material impregnated with a thermosetting resin and having first and second sides; a first elastic and rigid strip member removably attached to the first side of the flexible tubular lining material so as to extend along a substantially entire length of the flexible tubular lining material; and a second elastic and rigid strip member removably attached to the second side of the flexible tubular lining material so as to extend along the substantially entire length of the flexible tubular lining material.

2. A lining material according to claim 1; wherein each of the first and second strip members is a steel belt.

3. A lining material according to claim 1; wherein the flexible tubular lining material is folded and bound by the first and second strip members so as to provide a reduced width.

4. A lining material according to claim 1; wherein the first and second sides of the flexible tubular lining material are opposite one another so that the first and second strip members sandwich the flexible tubular lining material.

5. A lining material according to claim 1; wherein each of the first and second strip members is made of a thin metal plate.

6. A lining material according to claim 1; wherein the flexible tubular lining material is folded and bound by a plurality of binding members wound around a width of the folded flexible tubular lining material at preselected intervals along the length of the flexible tubular lining material.

7. A lining material according to claim 1; wherein each of the first and second strip members is attached to the flexible tubular lining material so that a tip of each of the first and second strip members protrudes from a tip of the lining material.

8. A pipeline lining method using a flexible tubular lining material impregnated with a thermosetting resin, comprising the steps:

removably attaching first and second elastic and rigid strip members to respective opposite sides of the lining material;

drawing or inserting into a pipeline the lining material to which the first and second strip members are attached;

removing and extracting the first and second strip members from the lining material while retaining the lining material inside the pipeline; and subjecting the lining material to pressure to cause it to expand against an inner peripheral surface of the pipeline and heating the lining material to cause the thermosetting resin thereof to be cured.

9. A lining material according to claim 1; wherein each of the first and second rigid strip members is made of metal.

10. A lining material according to claim 1; wherein each of the first and second rigid strip members comprises a thin plate-shaped member.

11. A lining material according to claim 6; further comprising a plurality of loop members attached to the first and second sides of the flexible tubular lining material at preselected intervals in the lengthwise direction thereof; and wherein the first and second rigid strip members pass through the loop members on the respective first and second sides of the flexible tubular lining material.

12. A method according to claim 8; wherein each of the first and second strip members is a steel belt.

13. A method according to claim 8; wherein each of the first and second strip members is made of a thin metal plate.

14. A method according to claim 8; wherein the removably attaching step comprises removably attaching each of the first and second strip members to the opposite sides of the lining material so that a tip of each of the first and second strip members protrudes from a tip of the lining material.

15. A method according to claim 8; further comprising, prior to the removably attaching step, a step of attaching a plurality of loop members to the opposite sides of the lining material at preselected intervals in the lengthwise direction thereof; and wherein the removably attaching step comprises passing the first and second strip members through the loop members on the respective opposite sides of the lining material.

16. A lining material for rehabilitating an existing pipeline, the lining material comprising:

a plurality of elastic and rigid strip members; and a flexible tubular body impregnated with a thermosetting resin and interposed between the strip members along a substantially entire length of the flexible tubular body.

17. A lining material according to claim 16; wherein each of the strip members is a thin metal plate.

18. A lining material according to claim 16; wherein each of the strip members is a steel belt.

19. A lining material according to claim 16; further comprising a plurality of loop members attached to opposite sides of the flexible tubular body at preselected intervals in the lengthwise direction thereof; and wherein the strip members pass through the loop members on the respective opposite sides of the flexible tubular body.

20. A lining material according to claim 16; wherein the flexible tubular body is folded and bound by the strip members so as to reduce a width of the folded flexible tubular body.

* * * * *